US011222214B2

(12) United States Patent
To (10) Patent No.: US 11,222,214 B2
(45) Date of Patent: Jan. 11, 2022

(54) AUTONOMOUS TAXI

(71) Applicant: VOLKSWAGEN AKTIENGESELLSCHAFT, Wolfsburg (DE)

(72) Inventor: Thanh-Binh To, Braunschweig (DE)

(73) Assignee: Volkswagen Aktiengesellschaft

( * ) Notice: Subject to any disclaimer, the term of this patent is extended or adjusted under 35 U.S.C. 154(b) by 239 days.

(21) Appl. No.: 16/718,469

(22) Filed: Dec. 18, 2019

(65) Prior Publication Data

US 2020/0202142 A1   Jun. 25, 2020

(30) Foreign Application Priority Data

Dec. 20, 2018   (DE) ..................... 10 2018 222 665.2

(51) Int. Cl.
*G06K 9/00* (2006.01)
*G05D 1/00* (2006.01)
*G05D 1/02* (2020.01)

(52) U.S. Cl.
CPC ....... *G06K 9/00791* (2013.01); *G05D 1/0088* (2013.01); *G05D 1/0287* (2013.01); *G06K 9/00355* (2013.01); *G06K 9/00362* (2013.01); *G05D 2201/0212* (2013.01)

(58) Field of Classification Search
CPC ........... G06K 9/00791; G06K 9/00355; G06K 9/00362; G06K 9/00221; G06K 9/00375; G05D 1/0088; G05D 1/0287; G05D 2201/0212; B60R 16/02; B60Q 1/26; G06Q 50/30; G06Q 50/50; G06F 3/017; G06F 3/0304; G06F 3/0426; G06F 3/04883

USPC .......................................................... 382/104
See application file for complete search history.

(56) References Cited

U.S. PATENT DOCUMENTS

| | | | | |
|---|---|---|---|---|
| 9,836,057 | B2 * | 12/2017 | Fairfield ................. | G08G 1/202 |
| 2004/0036622 | A1 * | 2/2004 | Dukach ................... | G06Q 30/02 |
| | | | | 340/691.6 |
| 2011/0143779 | A1 * | 6/2011 | Rowe ...................... | G06Q 30/02 |
| | | | | 455/456.3 |
| 2014/0300449 | A1 * | 10/2014 | Kounavis .......... | H04M 1/72403 |
| | | | | 340/6.1 |
| 2015/0268730 | A1 * | 9/2015 | Walline ................. | G06F 3/0393 |
| | | | | 345/168 |
| 2015/0279131 | A1 * | 10/2015 | Nespolo .................. | G06F 3/014 |
| | | | | 340/5.72 |

(Continued)

FOREIGN PATENT DOCUMENTS

| | | | |
|---|---|---|---|
| CN | 103079169 A | * | 5/2013 |
| CN | 105404929 A | * | 3/2016 |

(Continued)

*Primary Examiner* — Mahendra R Patel
(74) *Attorney, Agent, or Firm* — Barnes & Thornburg LLP (57) ABSTRACT

An autonomously driving taxi having a driving module for autonomous driving of the taxi based on sensors assigned to the driving module, wherein the taxi has an external camera arrangement for capturing images of surroundings of the taxi and an analysis module for analyzing the images of the surroundings of the taxi for a gesture that is interpreted as hailing a taxi, wherein the taxi includes an external display for displaying information outside the taxi and an external-display controller for displaying on the external display an image of the person associated with the gesture that is interpreted as hailing a taxi.

12 Claims, 7 Drawing Sheets

(56) References Cited

U.S. PATENT DOCUMENTS

| | | | | |
|---|---|---|---|---|
| 2016/0086391 A1* | 3/2016 | Ricci | ............... | G06Q 10/10 |
| | | | | 701/29.3 |
| 2016/0378303 A1* | 12/2016 | Crilley | ............... | G06T 13/80 |
| | | | | 715/733 |
| 2017/0330044 A1* | 11/2017 | Telpaz | ............... | B60K 35/00 |
| 2018/0196417 A1* | 7/2018 | Iagnemma | ............... | G05D 1/0027 |
| 2018/0211541 A1* | 7/2018 | Rakah | ............... | B60W 60/00253 |
| 2018/0349699 A1* | 12/2018 | O'Connell | ............... | G08G 1/205 |
| 2019/0263422 A1* | 8/2019 | Enthaler | ............... | G06K 9/00355 |

FOREIGN PATENT DOCUMENTS

| | | | | | |
|---|---|---|---|---|---|
| CN | 108237974 | A | * | 7/2018 | |
| CN | 109712387 | A | * | 5/2019 | ............ G08B 21/02 |
| DE | 10217633 | A1 | | 11/2003 | |
| DE | 102016217770 | A1 | | 3/2018 | |
| DE | 202018003053 | U1 | | 7/2018 | |
| JP | 2015191641 | A | | 11/2015 | |
| JP | 2019175259 | A | * | 10/2019 | ............ G06Q 50/30 |
| WO | WO-2016134513 | A1 | * | 9/2016 | ............ H04L 29/08 |
| WO | 2018106385 | A1 | | 6/2018 | |

\* cited by examiner

$\begin{bmatrix} ID \\ BLD \\ ABH \\ 0 \\ 0 \end{bmatrix}$

FIG. 4

$\begin{bmatrix} ID \\ BLD \\ ABH \\ ZIL \\ 1 \end{bmatrix}$

$$\begin{bmatrix} 0 \\ BLD \\ ABH \\ 0 \\ 0 \end{bmatrix}$$

AUTONOMOUS TAXI

PRIORITY CLAIM

This patent application claims priority to German Patent Application No. 10 2018 222 665.2, filed 20 Dec. 2018, the disclosure of which is incorporated herein by reference in its entirety.

SUMMARY

Illustrative embodiments relate to an autonomously driving taxi having a driving module for autonomous driving of the taxi on the basis of sensors assigned to the driving module, wherein the taxi comprises an external camera arrangement for capturing images of surroundings of the taxi, and an analysis module for analyzing the images of the surroundings of the taxi for a gesture that can be interpreted, or is meant to be interpreted, as hailing a taxi. Illustrative embodiments also relate to a method for operating an autonomously driving taxi and to a method for operating a traffic system containing a plurality of autonomously driving taxis.

BRIEF DESCRIPTION OF THE DRAWINGS

Disclosed embodiments are described below with reference to the drawings, in which.

DETAILED DESCRIPTION

US 2015/0279131 A1 discloses a system for controlling functions of a transportation vehicle remotely. The system comprises transmitter, an energy storage device, an accelerometer and a control unit. The control unit is configured to recognize gestures of a user that represent functional commands.

DE 10 2016 217 770 A1 discloses a method for operating a transportation vehicle having a camera unit that captures the area in front of the transportation vehicle, and associated control unit for analyzing the images, wherein the control unit analyzes the images to detect at least one hand movement performed by the people shown in the images, wherein on detecting a hand movement that describes a gesture indicating a stop request, either the self-driving transportation vehicle is stopped or the driver of the transportation vehicle is given a signal signaling the stop request.

WO 2018/106385 A1 discloses a system for identifying a client for an automated taxi, the automated taxi comprising a communications network, a camera and a controller. The communications network is used to transmit a transportation instruction from a client to an autonomous taxi.

Disclosed embodiments improve, or make more efficient, the operation of autonomous taxis or autonomously driving taxis. It is particularly desirable in this context to improve the utilization of a fleet of autonomously driving taxis. It is also desirable to shorten the waiting times for passengers of autonomously driving taxis.

This is achieved by an autonomously driving taxi having a driving module for autonomous driving of the taxi on the basis of sensors assigned to the driving module, wherein the taxi comprises an external camera arrangement for capturing images of surroundings of the taxi, and an analysis module for analyzing the images of the surroundings of the taxi for a gesture that can be interpreted, or is meant to be interpreted, as hailing a taxi, wherein the taxi comprises an external display for displaying information outside the taxi, and an external-display controller for displaying on the external display an image, in particular, a portrait picture, of the person associated with the gesture that can be interpreted, or is meant to be interpreted, as hailing a taxi.

Autonomously driving within the meaning of this disclosure relates to Level 5. This means that an automated driving system comprehensively performs under all driving and environmental conditions, all facets of the dynamic driving task that a human driver can perform. An external camera arrangement within the meaning of this disclosure can comprise one or more cameras. A camera in this sense may be, for example, an HDR camera or a neuromorphic camera. A gesture within the meaning of this disclosure may be a gesture confined purely to a hand. It may also be the case, however, that a gesture also includes a gesture made by a smartphone (see WO 2018/106385 A1).

In another disclosed embodiment, the external display includes a display area of at least 0.2 m$^2$, in particular, of at least 0.25 m$^2$. In another disclosed embodiment, the external display comprises a windowpane of the taxi. It can also be provided that additionally or alternatively, the roadway, for instance, in front of the taxi, serves as a projection surface for a corresponding projector of the taxi.

In another disclosed embodiment, the external camera arrangement and the analysis module are in operation even when the taxi is occupied, wherein the taxi comprises a communications interface for sending an image, in particular, a portrait picture, of the person associated with the gesture that can be interpreted, or is meant to be interpreted, as hailing a taxi.

This is also achieved in combination with one or more of the aforementioned features, by an autonomously driving taxi having a driving module for autonomous driving of the taxi on the basis of sensors assigned to the driving module, wherein the taxi comprises an external camera arrangement for capturing images of surroundings of the taxi, and an analysis module for analyzing the images of the surroundings of the taxi for a gesture that can be interpreted, or is meant to be interpreted, as hailing a taxi, wherein the external camera arrangement and the analysis module are in operation even when the taxi is occupied, wherein the taxi comprises a communications interface for sending an image, in particular, a portrait picture, of the person associated with the gesture that can be interpreted, or is meant to be interpreted, as hailing a taxi.

This is also achieved in combination with one or more of the aforementioned features, by a method for operating an autonomously driving taxi having a driving module for autonomous driving of the taxi on the basis of sensors assigned to the driving module, wherein an external camera arrangement of the taxi is used to capture images of surroundings of the taxi, wherein the images of the surroundings of the taxi are analyzed for a gesture that can be interpreted, or is meant to be interpreted, as hailing a taxi, wherein a gesture is interpreted as hailing a taxi, characterized in that an external display of the taxi is used to display (outside the taxi) an image, in particular, a portrait picture, of the person associated with the gesture interpreted as hailing a taxi.

This is also achieved in combination with one or more of the aforementioned features, by a method for operating a traffic system containing at least two autonomously driving taxis, a first taxi and at least a second taxi, each having a driving module for autonomous driving of the taxi on the basis of sensors assigned to the driving module, wherein an external camera arrangement of each of the at least two taxis is used to capture images of surroundings of the taxi concerned irrespective of whether or not the taxi concerned is occupied, wherein the images of the surroundings of the taxi concerned are analyzed for a gesture that can be interpreted, or is meant to be interpreted, as hailing a taxi, wherein the first taxi is occupied, wherein the first taxi interprets a gesture as hailing a taxi, wherein an image, in particular, a portrait picture, of the person associated with the gesture interpreted as hailing a taxi is transmitted from the first taxi to the second taxi (in particular, in association with location information), and wherein an external display of the second taxi is used to display (outside the second taxi) the transmitted image, in particular, the transmitted portrait picture.

Figure 1:
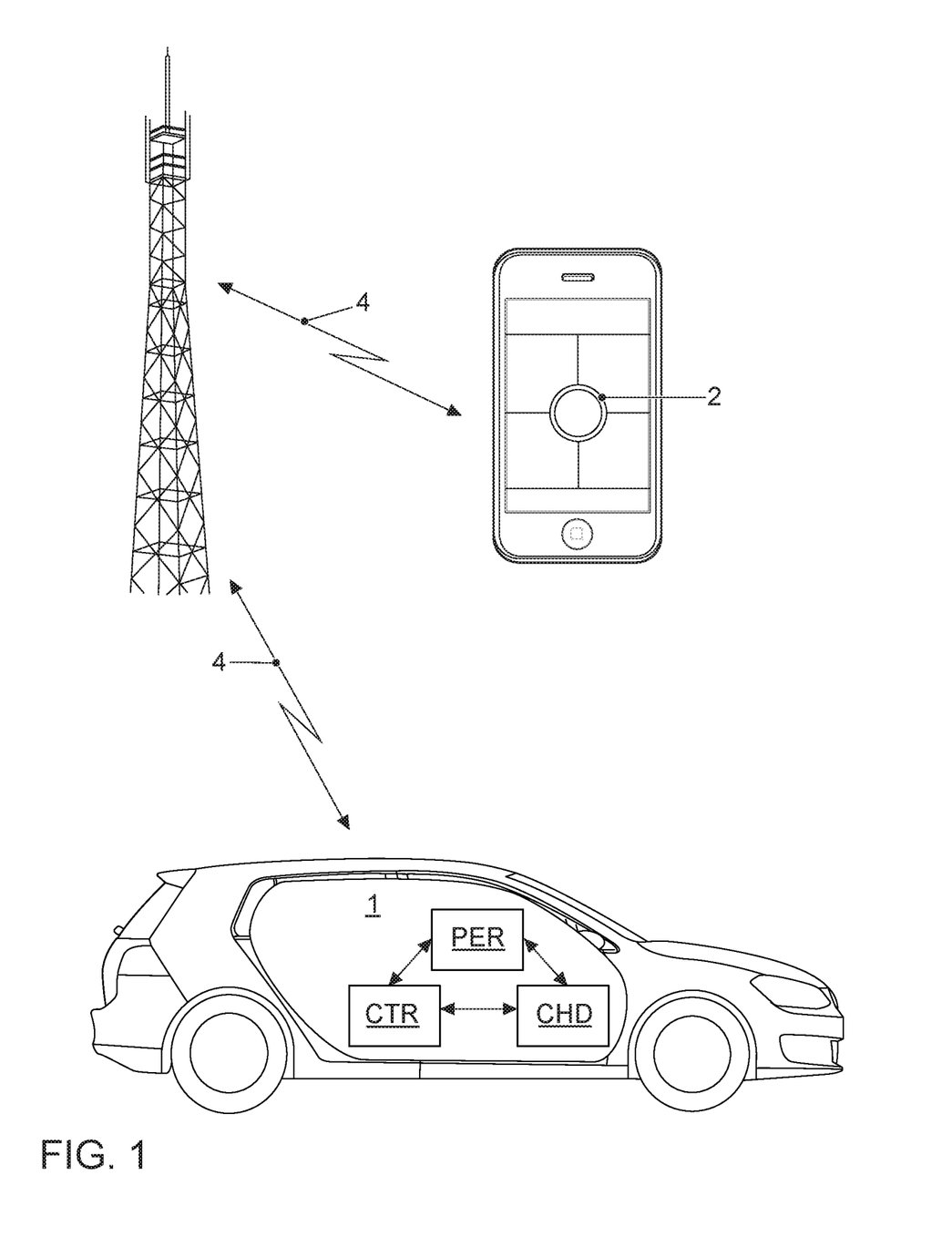
FIG. 1 is a block diagram of an exemplary embodiment of an autonomously driving taxi.

FIG. 1 shows an autonomously operating taxi 1, which can be in data communication with a computer of a user such as a smartphone 2, for instance, via a wireless communications system 4 such as a mobile communications network. The autonomously operating taxi 1 comprises a controller CTR, peripheral devices PER and a supervision module CHD.

Figure 2:
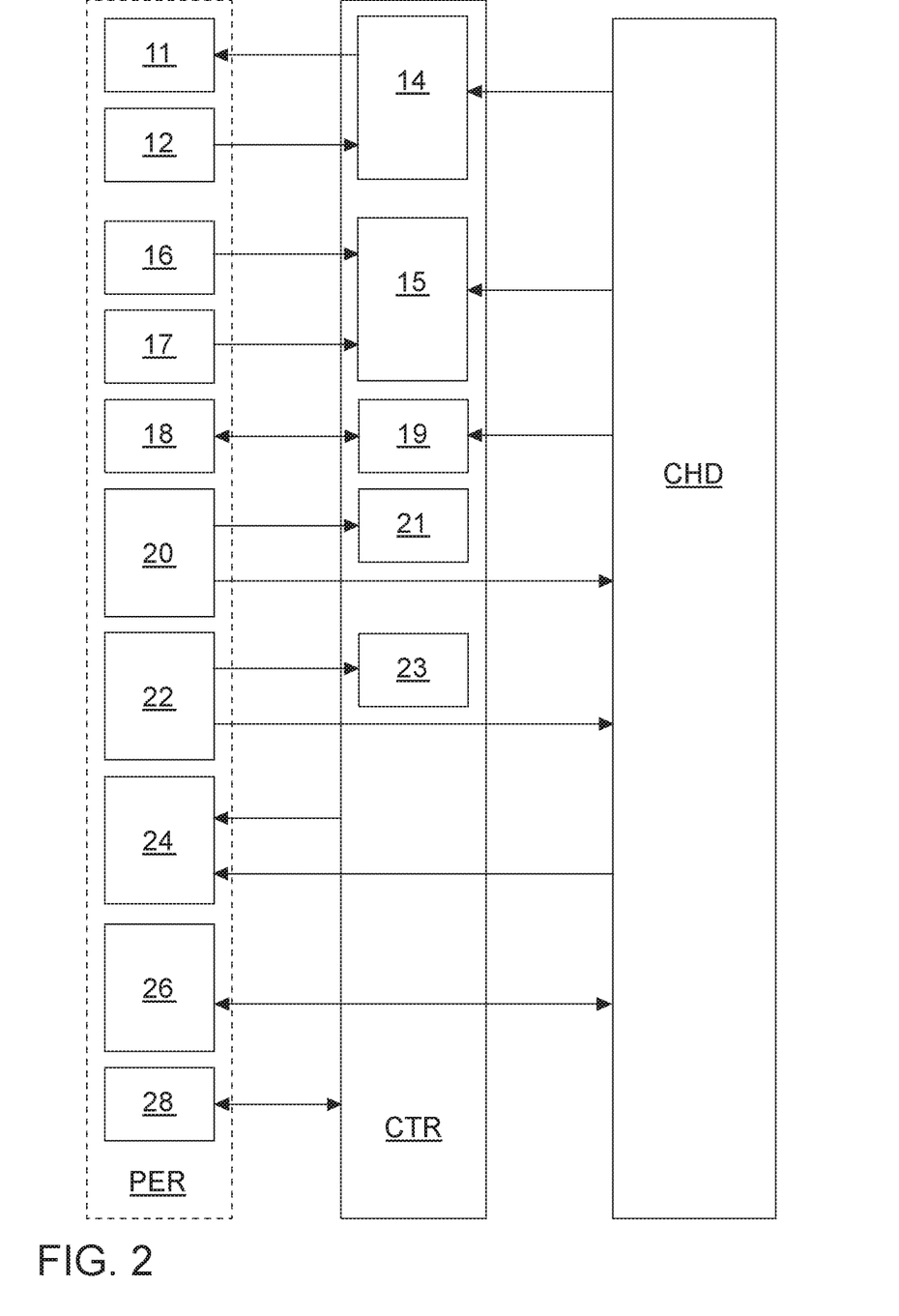
FIG. 2 shows an example embodiment of modules and links between modules of the autonomously driving taxi in FIG. 1.

FIG. 2 shows the peripheral devices PER, the central controller CTR and the supervision module CHD in a detailed view. The peripheral devices PER comprise, inter alia, actuators 11 and external sensors 12. The actuators 11 may comprise, inter alia, a steering actuator, a brake actuator and a drive actuator. The external sensors 12 may comprise ultrasound, lidar, sonar, a camera arrangement and, in particular, radar. An autonomous driving module 14 determines the setpoint values for the actuators 11 on the basis of the output variables from the external sensors 12. In other words, the actuators 11 and hence the taxi 1 are controlled by the autonomous driving module 14 on the basis of the external sensors 12 and a route determined by a navigation system 15. A GPS 16 for determining the present position of the autonomously operating taxi 1, and an input apparatus 17 for a user to input a destination belong to the navigation system 15.

The peripheral devices PER also include actuators and sensors 18 for automatic operation of a door by a door controller 19. The peripheral devices PER additionally comprise interior sensors 20, which include a camera used by a monitoring module 21 to monitor the situation inside the autonomously operating taxi 1.

In addition, an external camera arrangement 22 is provided, which is used to monitor the surroundings of the autonomously operating taxi 1 to ascertain a passenger. Reference sign 24 denotes an external display, which can be used to display a passenger being sought by the autonomously operating taxi 1. The peripheral devices PER also include an emergency stop button and a communications interface 26 to the wireless communications system 4. The peripheral devices PER may also include a reader, for example, for an e-ticket.

Figure 3:
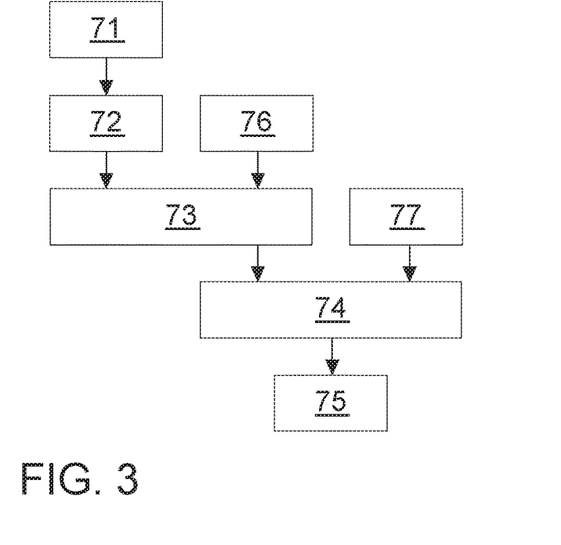
FIG. 3 shows in simplified form an example of a method for operating an the autonomously driving taxi in FIG. 1.
Figure 4:
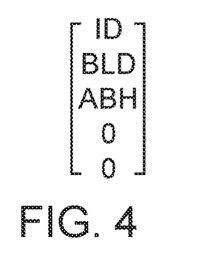
FIG. 4 is a block diagram of a protocol for communicating with the autonomously driving taxi in FIG. 1.
Figure 5:
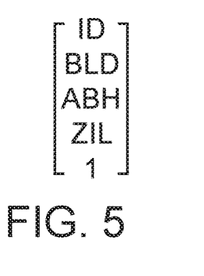
FIG. 5 shows the protocol of FIG. 4.

FIG. 3 shows a method for operating the autonomously operating taxi 1, which method may begin with an operation at 71, in which the taxi 1 is ordered, with an operation at 76, in which the taxi is called for by another taxi 1, or with an operation at 77. It can be provided that operation at 71 also includes a destination being entered, which is followed by a pick-up instruction being transferred (to the control center) as a dataset or protocol as shown in FIG. 4 or FIG. 5. ID denotes here a name or client name or other identification. BLD denotes the image of the passenger. ABH denotes pick-up location, and ZIL denotes destination location. The fifth entry relates to a flag, which is set if the passenger is not a "basic passenger". A passenger who is not a "basic passenger" shall be understood to mean a child. It can also be understood to mean an adult with impaired health, however. A passenger who is not a "basic passenger", however, may also be simply a non-local adult.

Figure 6:
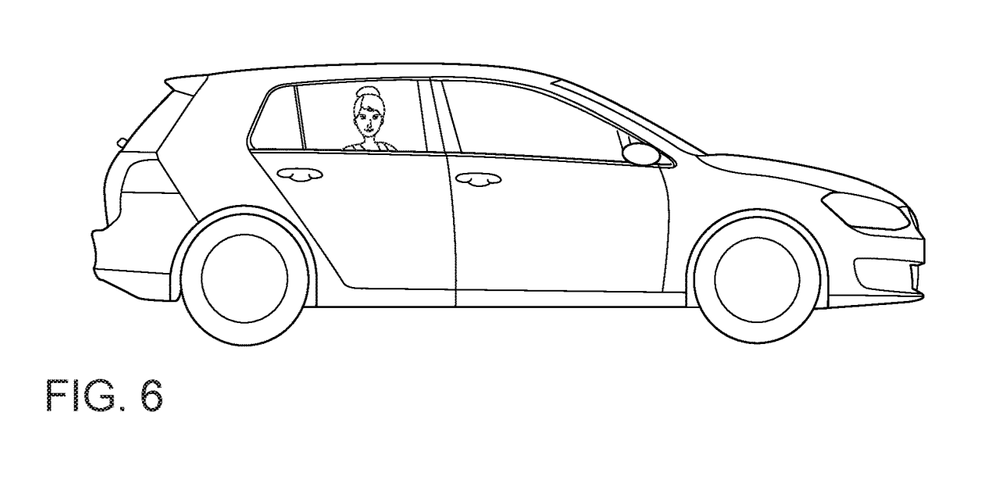
FIG. 6 shows the autonomously driving taxi of FIG. 1 immediately before picking up an unaccompanied child as a passenger.

The operation at 71 for ordering the autonomously operating taxi 1 is followed by an operation at 72, in which the order is confirmed. This operation and the operation at 76 are followed by the passenger being picked up (operation at 73). To pick up the passenger, the autonomously operating taxi 1 first moves autonomously to the pick-up location. In addition, as shown in FIG. 6, an image of the passenger to be picked up is displayed by the external display 24. The external camera arrangement 22 and an image analyzer connected thereto are also used to search for the passenger. If the passenger is recognized, the autonomously operating taxi 1 stops and grants the recognized passenger entry to the autonomously operating taxi 1.

Operation at 73, in which the passenger is picked up, and operation at 77 are followed by an operation at 74, in which the passenger is taken to the destination. Once arrived the destination, the autonomously operating taxi 1 sets down the passenger (operation 75). In addition, the autonomously operating taxi 1 sends to the control center a confirmation of the successful journey. The control center in turn sends the confirmation, or the completion of the instruction, to the smartphone 2, which displays this confirmation to the user of the smartphone 2.

The supervision module CHD extends the functionality of the central controller CTR, or interacts therewith, if the passenger is not a "basic passenger" and also is unaccompanied. The same applies also to a plurality of passengers who are not "basic passengers" and also are unaccompanied. Thus it is provided, for instance, by the supervision module CHD, that an emergency off or emergency stop can be imposed on the autonomous driving module 14. In addition, the supervision module CHD blocks the destination input by the input apparatus 17. The supervision module CHD also blocks, except for an emergency opening, the facility to open the door 18.

Figure 7:
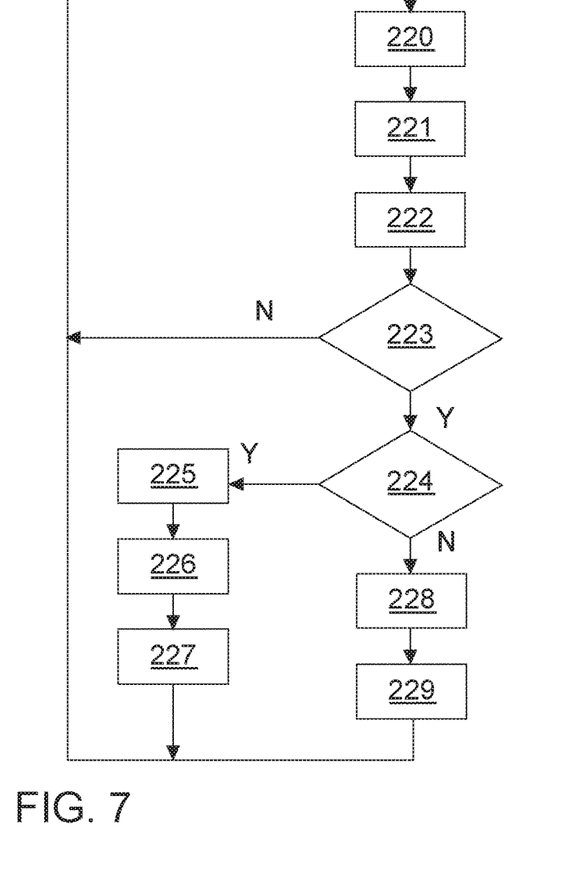
FIG. 7 shows in simplified form an example of a method for operating the autonomously driving taxi in FIG. 1.
Figure 8:
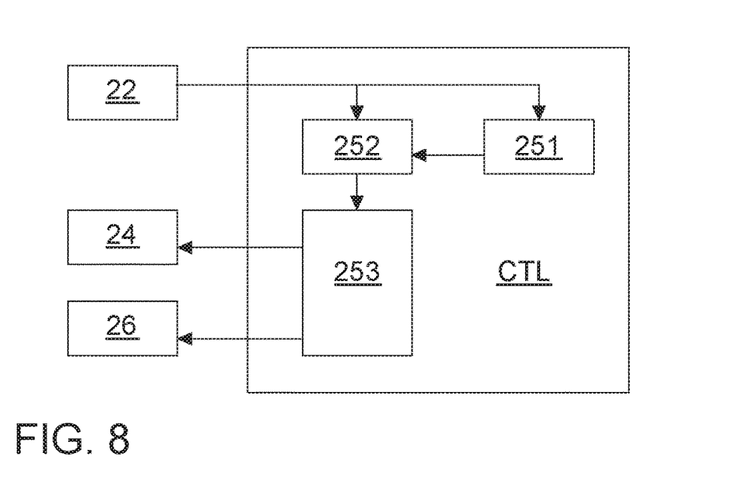
FIG. 8 is a block diagram of the control of an external display of the autonomously driving taxi in FIG. 1.

FIG. 7 shows a method described in greater detail for an autonomous taxi, or the autonomous taxi 1, picking up a passenger, and FIG. 8 shows the underlying functions, which include an analysis module 251 for analyzing for a gesture, images of the surroundings of the taxi 1 captured by the external camera arrangement 22. A face recognition module 252 is also provided for isolating an image of a face of the person associated with the gesture that can be interpreted, or is meant to be interpreted, as hailing a taxi. An external-display controller 253 is used optionally for displaying or for sending via the communications interface 26 (see FIG. 14) the image of the face on the external display 24.

The method described with reference to FIG. 7 for operating the taxi 1 starts with an operation at 220, in which the taxi 1 is acting as a road user. The taxi 1 can also have the option to wait for a passenger at a specific stopping point. During operation, the autonomous taxi 1 captures its surroundings by a surroundings external camera arrangement 22 that is aimed forwards. Operation 220 is followed by an operation at 221 comprising image processing in which the images captured by the external camera arrangement 22 are analyzed.

This is followed by an operation at 222, in which the conditioned or analyzed images are examined for gestures that symbolize a stop request. Operation at 222 is followed by a query 223 to establish whether a gesture is, or might be, or can be interpreted as a lift request, or has been recognized as such. If a gesture has not been recognized, then the operation at 220 again follows the query 223. Cycling through the loop comprising operations at 220, 221, 222 and the query 223 is performed not only when the taxi 1 is free, i.e., can pick up passengers, but also when the autonomous taxi is occupied.

If a gesture is recognized which the autonomous taxi 1 identifies as a ride request, then the query 223 is followed by a query 224 as to whether the autonomous taxi 1 is available. If the autonomous taxi 1 is available, then the query 224 is followed by an operation at 225, in which it is signaled to the potential passenger that the autonomous taxi 1 is available, and also which passenger has been recognized.

Figure 9:
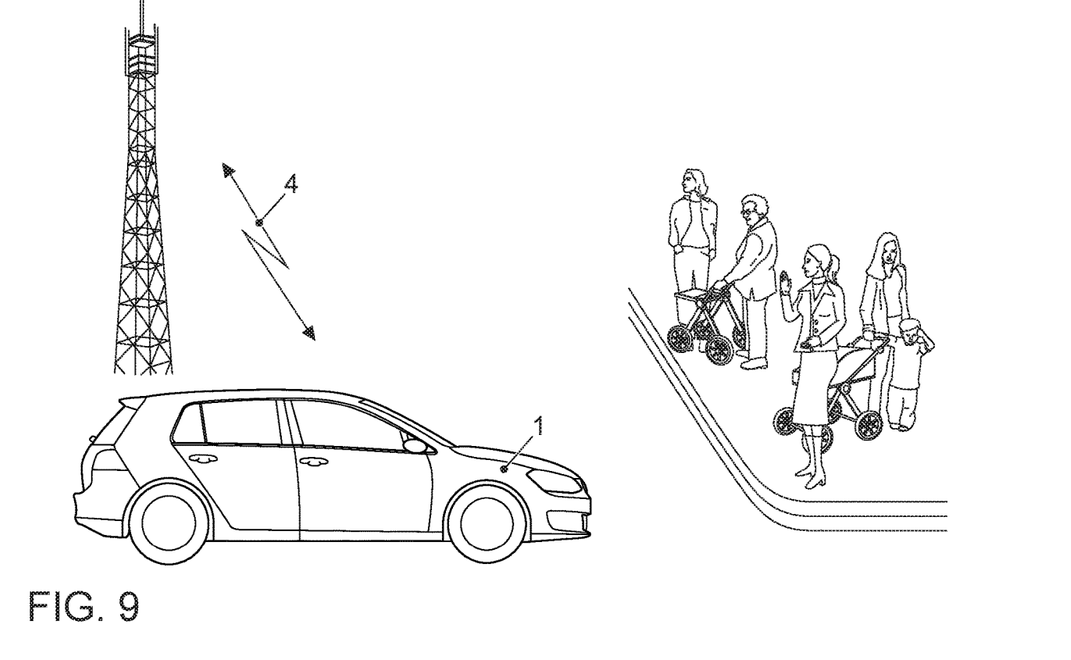
FIG. 9 is an exemplary embodiment of a gesture-based taxi-hail of the autonomously driving taxi in FIG. 1.
Figure 10:
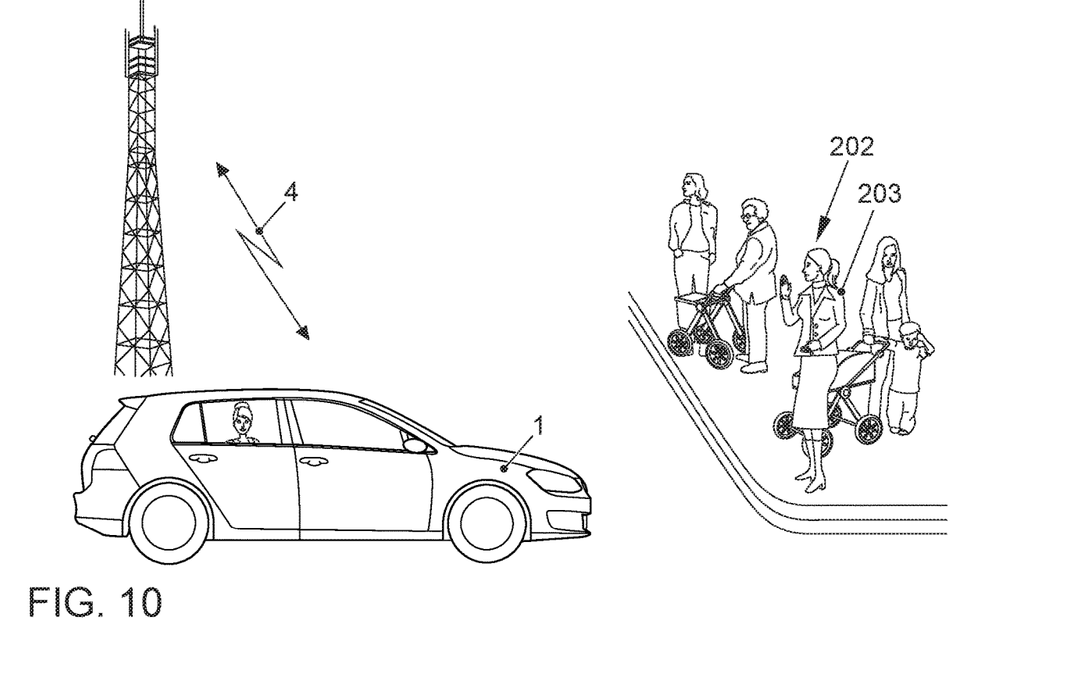
FIG. 10 shows a continuation of the situation of FIG. 9 in which the passenger to be picked up is displayed.
Figure 11:
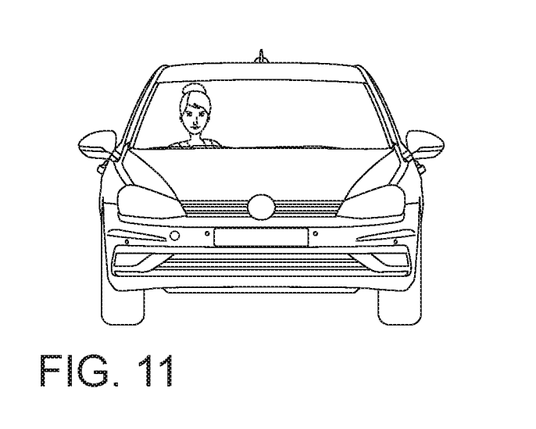
FIG. 11 shows the situation of FIG. 10 comprising an alternative or additional display on a rear window of the passenger to be picked up.
Figure 12:
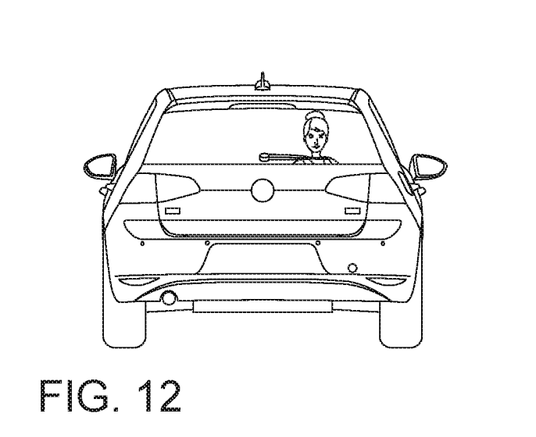
FIG. 12 shows the situation of FIG. 10 comprising an alternative or additional display on a front window or windscreen of the passenger to be picked up.

FIG. 9 and FIG. 10 are used to explain the operations described. Based on FIG. 1 of WO 2018/106385 A1, FIG. 9 shows the road-using autonomous taxi 1, which is approaching a group 202 of people, i.e., potential passengers. In this group of people 202, the autonomous taxi 1 recognizes a woman 203 by a gesture that is recognized or interpreted as a stop request or ride request. To signal to the woman 203 recognized as a passenger that her stop request or her ride request has been recognized, the autonomous taxi 1 flashes and stops. In addition, an image, which shows the person whose gesture has been recognized or interpreted as a stop request, is displayed on an external display 24. In addition to the external display 24, a corresponding external display 24 can also be provided in the front window of the autonomous taxi 1 (see FIG. 11) and/or in the rear window (see FIG. 12). The scenario described corresponds to operation at 225 in FIG. 8. This operation at 225 is followed by an operation at 226, in which the passenger gets into the autonomous taxi 1. For this purpose, a door is opened and, once the passenger 203 has got in, closed again.

Operation at 226 is followed by an operation at 227, in which the transportation instruction is carried out. To this end, the passenger or recognized person first inputs a destination using the destination input apparatus. The navigation system subsequently computes the route for the autonomous taxi 1. Once the destination is reached, i.e., the transportation of the person 203 is concluded, then once again operations at 220 follows operation at 227.

Figure 13:
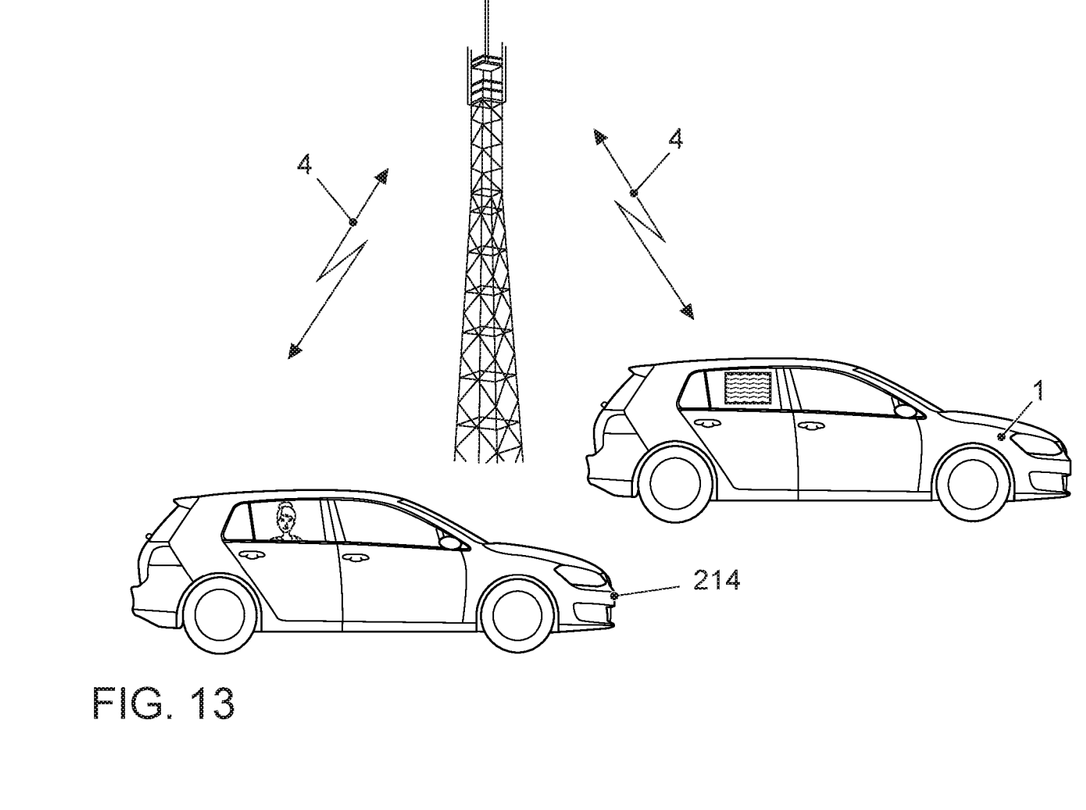
FIG. 13 shows a continuation of the situation of FIG. 9 in the case that a taxi is not free.
Figure 14:
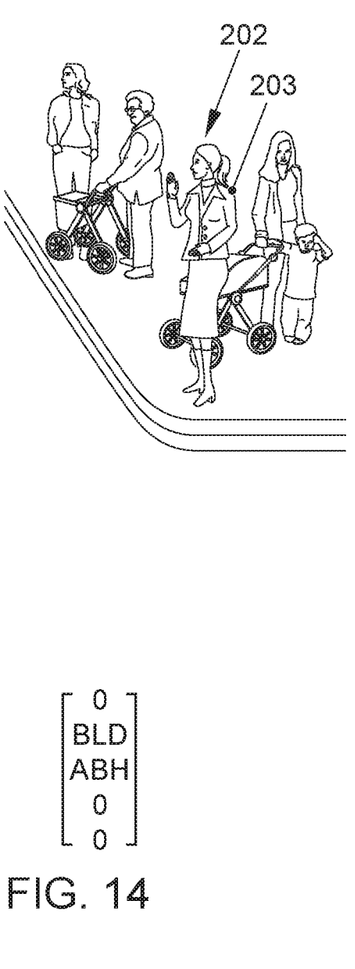
FIG. 14 shows the protocol of FIG. 4 and FIG. 5.

On the other hand, if the autonomous taxi 1 is not available (see query 224), then the query 224 is followed by an operation at 228, in which the autonomous taxi 1 transfers the lift request to another taxi 214, in particular, via a control center, as described with reference to FIG. 13. The selected autonomous taxi 214 moreover displays the image of the recognized potential passenger on an external display 24. To do this, a dataset or a protocol as shown in FIG. 14 is transmitted from the autonomous taxi 1 to the autonomous taxi 214 (if applicable via the control center). The transmission comprises the pick-up location ABH and the image BLD of the passenger to be picked up. Operation at 228 is followed by an operation at 229, in which the potential passenger 203 is informed by the external display 24 that it is occupied. In addition, it is displayed to the potential passenger 203 that another autonomous taxi 214 is already on its way to pick up this passenger 203.

The invention claimed is:

1. An autonomously driving taxi comprising:
a plurality of sensors for generating data about surroundings of the taxi, wherein the plurality of sensors include an external camera arrangement for capturing images of surroundings of the taxi;
a driving module for autonomous driving of the taxi based on data generated by the plurality of sensors assigned to the driving module;
an analysis module for analyzing the images of the surroundings of the taxi to identify a gesture that is interpreted as taxi hailing;
an external display for displaying information outside the taxi; and
an external display controller for displaying, on the external display, an image of a person associated with the identified taxi hailing gesture,
wherein the external camera arrangement and the analysis module grant access to occupy the taxi for the person associated with the identified taxi hailing gesture whose image is displayed on the external display of the taxi,
wherein the external camera arrangement and the analysis module continue operation to identify taxi hailing gestures of people outside the taxi while the taxi is occupied, and
wherein the taxi further comprises a communications interface for sending a captured image of a person associated with a taxi hailing gesture to another taxi during occupation of the taxi to facilitate hailing of the other taxi for the person associated with taxi hailing gesture identified outside the occupied taxi.

2. The taxi of claim 1, wherein the external display comprises a display area of at least 0.2 m$^2$.

3. The taxi of claim 1, wherein the external display comprises a windowpane of the taxi.

4. The taxi of claim 1, wherein the communications interface transmits the image of the person associated with the taxi hailing gesture to the other taxi in association with location information of the person to enable the other taxi to travel to the location of the person and display the person's image on the other taxi's external display to facilitate hailing and operation of the other taxi by the person associated with the taxi hailing gesture.

5. An autonomously driving taxi comprising:
a plurality of sensors for generating data about surroundings of the taxi, wherein the plurality of sensors include an external camera arrangement for capturing images of surroundings of the taxi;
a driving module for autonomous driving of the taxi based on data generated by the plurality of sensors assigned to the driving module;
an analysis module for analyzing the images of the surroundings of the taxi to identify a gesture that is interpreted as taxi hailing; and
a communications interface for sending an image of the person associated with the gesture that is interpreted as taxi hailing,
wherein the external camera arrangement and the analysis module grant access to occupy the taxi for the person associated with the identified taxi hailing gesture,
wherein the external camera arrangement and the analysis module continue operation to identify taxi hailing gestures of people outside the taxi while the taxi is occupied, and
wherein the taxi further comprises a communications interface for sending a captured image of a person associated with a taxi hailing gesture to another taxi during occupation of the taxi to facilitate hailing of the other taxi for the person associated with taxi hailing gesture identified outside the occupied taxi.

6. A method for operating an autonomously driving taxi having a driving module for autonomous driving of the taxi based on data about the surroundings of the tax generated by a plurality of sensors assigned to the driving module, the method comprising:
capturing images of surroundings of the taxi using an external camera arrangement of the taxi;
analyzing the images of the surroundings of the taxi to identify a gesture that is interpreted as taxi hailing;
displaying, on an external display outside the taxi, an image of the person associated with the identified taxi hailing gesture; and
granting access to occupy the taxi for the person associated with the identified taxi hailing gesture whose image is displayed on the external display of the taxi,
wherein the capturing and analyzing of images of the surroundings of the taxi continue to identify taxi hailing gestures of people outside the taxi while the taxi is occupied, and
the method comprises further comprises sending a captured image of a person associated with a taxi hailing gesture to another taxi during occupation of the taxi to facilitate hailing of the other taxi for the person associated with taxi hailing gesture identified outside the occupied taxi.

7. A method for operating a traffic system containing at least two autonomously driving taxis including a first taxi and a second taxi, wherein each taxi has a plurality of sensors for generating data about surroundings of the taxi, wherein the plurality of sensors include an external camera arrangement for capturing images of surroundings of the taxi, a driving module for autonomous driving of the taxi based on data generated by the plurality of sensors assigned to the driving module and an analysis module for analyzing the images of the surroundings of the taxi to identify a gesture that is interpreted as taxi hailing a taxi, the method comprising:
capturing, using an external camera arrangement of each of the at least two taxis, images of surroundings of the respective taxi irrespective of whether the respective taxi is occupied;
analyzing the images of the surroundings of the respective taxi to identify a gesture that is interpreted as taxi hailing, wherein access to occupy the taxi is granted for the person associated with the identified taxi hailing gesture based on the analysis;
while the first taxi is occupied, in response to the first taxi identifying a taxi hailing gesture, the first taxi transmitting an image of the person associated with the taxi hailing gesture to the second taxi; and
following receipt of the image of the person associated with the taxi hailing gesture captured by the first taxi, an external display of the second taxi displaying the transmitted image of the person associated with the taxi hailing gesture.

8. The taxi of claim 1, wherein the image of the person associated with the taxi hailing gesture that is transmitted to the other taxi is used to identify the person and grant access to the person occupy the other taxi.

9. The taxi of claim 5, wherein the communications interface transmits the image of the person associated with the taxi hailing gesture to the other taxi in association with location information of the person to enable the other taxi to travel to the location of the person and display the person's image on the other taxi's external display to facilitate hailing and operation of the other taxi by the person.

10. The taxi of claim 5, wherein the image of the person associated with the taxi hailing gesture that is transmitted to the other taxi is used to identify the person and grant access to the person occupy the other taxi.

11. The method of claim 6, wherein the image of the person associated with the taxi hailing gesture that is transmitted to the other taxi is used to identify the person and grant access to the person occupy the other taxi.

12. The method of claim 7, wherein the image of the person associated with the taxi hailing gesture that is transmitted to the second taxi is used to identify the person and grant access to the person occupy the second taxi.

* * * * *